United States Patent
Kuita

(10) Patent No.: US 6,456,976 B1
(45) Date of Patent: Sep. 24, 2002

(54) MOBILE TERMINAL PROVIDED WITH SPEECH RECOGNITION FUNCTION FOR DIAL LOCKING

(75) Inventor: Takehiko Kuita, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/447,833

(22) Filed: Nov. 23, 1999

(30) Foreign Application Priority Data

Nov. 26, 1998 (JP) ............................................ 10-336243

(51) Int. Cl.[7] .............................................. G10L 15/22
(52) U.S. Cl. ....................................... 704/273; 704/275
(58) Field of Search ................................. 704/273, 275, 704/270, 272, 231, 200, 247, 250, 251, 252, 255

(56) References Cited

U.S. PATENT DOCUMENTS

| | | | | |
|---|---|---|---|---|
| 4,797,924 A | * | 1/1989 | Schnars et al. | 704/275 |
| 5,117,460 A | * | 5/1992 | Berry et al. | 340/7.39 |
| 5,165,097 A | * | 11/1992 | Pegg | 380/44 |
| 5,301,223 A | * | 4/1994 | Amadon et al. | 379/114.19 |
| 5,402,481 A | * | 3/1995 | Waldman | 379/355.01 |
| 5,561,712 A | * | 10/1996 | Nishihara | 379/185 |
| 5,715,311 A | * | 2/1998 | Sudo et al. | 379/368 |
| 5,752,231 A | * | 5/1998 | Gammel et al. | 704/200 |
| 5,818,930 A | * | 10/1998 | Mark | 379/355.01 |
| 5,913,196 A | * | 6/1999 | Talmor et al. | 704/270 |
| 6,018,711 A | * | 1/2000 | French-St. George et al. | 455/231 |
| 6,119,084 A | * | 9/2000 | Roberts et al. | 704/243 |

FOREIGN PATENT DOCUMENTS

| | | | |
|---|---|---|---|
| GB | 2 314 739 A | * 6/1996 | ............ H04Q/7/32 |
| JP | 2-250532 | 10/1990 | |
| JP | 4-343554 | 11/1992 | |
| JP | 05-30166 | 2/1993 | |
| JP | 05-506768 | 9/1993 | |
| JP | 6-125305 | 5/1994 | |
| JP | 8-223281 | 8/1996 | |
| JP | 9-36980 | 2/1997 | |
| JP | 9-84128 | 3/1997 | |
| JP | 9-312687 | 12/1997 | |
| JP | 10-126495 | 5/1998 | |
| JP | 10-262279 | 9/1998 | |
| JP | 10-308818 | 11/1998 | |

* cited by examiner

*Primary Examiner*—Richemond Dorvil
(74) *Attorney, Agent, or Firm*—Sughrue Mion, PLLC

(57) ABSTRACT

A mobile telephone is composed of an antenna, a sending/receiving section, an automatic response control section, a memory, a key input section, a dial locking control section, a control section, a speech recognition section, a timer, a display section, a speech input section, a counter and a speaker. A character code from the key input section is stored in the memory. The control section determines if an aural signal is coincident with the character code stored in the memory. If there is coincidence, dial locking is set by the dial locking control section.

23 Claims, 5 Drawing Sheets

MOBILE TERMINAL PROVIDED WITH SPEECH RECOGNITION FUNCTION FOR DIAL LOCKING

BACKGROUND OF THE INVENTION

1. Field of the Invention

The present invention relates to a mobile telephone, particularly relates to a mobile telephone provided with a speech recognition function.

2. Description of the Related Art

A dial locking function in a conventional type mobile telephone is used for the following purposes. The above dial locking function is provided with first, a role of preventing a mobile telephone from being used without the owner's permission by a person except the owner in case the mobile telephone is stolen or lost and second, a role of protecting the contents (information) stored in a memory.

For a method of setting such a dial locking function, a method of setting dial locking by pressing Function key or Menu button and further, '#' button (should be pressed long) after the owner of a mobile telephone registers 4-digit personal identification numbers is conceivable. To release dial locking, a method of inputting the formerly registered 4-digit personal identification numbers and pressing a talk button is conceivable.

In the meantime, for a speech recognition function of a conventional type mobile telephone, a mobile telephone provided with a function that when voice corresponding to a registered telephone number, for example a name of Mr./Ms. A is recognized, a telephone number corresponding to recognized Mr./Ms. A is automatically dialed and called is known.

However, the setting and the release of the dial locking function in the above mobile telephone have the following problems.

A first problem is that as the operation of many buttons is required to set or release the dial locking function, it is troublesome to turn on or turn off the dial locking function every call and therefore, a few persons set the dial locking function.

A second problem is that as operation for setting the above dial locking function cannot be performed after a mobile telephone is stolen or lost, dial locking cannot be set.

A third problem is that as pointed out in the description of the second problem, if a mobile telephone is stolen or lost, it may be used without the owner's permission by a person except the owner and probability that the owner suffers damage such as the owner suffers the damage of money and the contents (information) stored in a memory is stolen is high.

SUMMARY OF THE INVENTION

The present invention is made to solve the above problems and the object is to provide a mobile terminal wherein dial locking can be set by a speech recognition function.

To achieve the above object, the present invention is provided with a memory for registering a desired character code, au aural signal recognition circuit for recognizing an aural signal, a control section for determining whether a character code registered in the memory and an aural signal recognized by the aural signal recognition circuit are coincident or not and a dial locking setting section for setting dial locking in case it is determined in the control section that the character code and the aural signal are coincident.

Also, the present invention is provided with a memory for registering a desired character code, a response control section for responding to an incoming call, a speech recognition section for recognizing an aural signal when a response is made by the response control section, a control section for determining whether a character code registered in the memory and an aural signal recognized by the aural signal recognition section are coincident or not and a dial locking control section for setting dial locking in case it is determined in the control section that the aural signal and the character code are coincident.

For a mobile telephone according to the present invention, a mobile telephone wherein it is determined by pressing a button whether an automatic response is set or not is desirable.

In the present invention, it is desirable that the response control section sends a message showing that a response is made when responding to an incoming call and becomes a recording state for recording an aural signal when the message is sent.

In the present invention, it is desirable that if it is determined by the control section that an aural signal and a character code are coincident, a dial locking release function that a dial locked state set by the dial locking control section is released is provided.

In the present invention, it is desirable that it is determined plural times by the control section whether an aural signal and a character code are coincident or not.

The present invention is characterized in that a desired character code is registered, an aural signal is recognized, it is determined whether the registered character code and the recognized aural signal are coincident or not and if the character code and the aural signal are coincident, dial locking is set.

Also, the present invention is characterized in that a desired character code is registered, a response is made to an incoming call, an aural signal is recognized at the time of the response, it is determined whether the registered character code and the recognized aural signal are coincident or not and if the aural signal and the character code are coincident, dial locking is set.

In the present invention, it is desirable that a method of locking the dial of a mobile telephone is provided and it is determined by pressing a button whether an automatic response is set or not.

In the present invention, it is desirable that a message showing that a response is made is sent when responding to the incoming call and after the message is sent, a state is switched to a recording state for recording an aural signal.

It is desirable in relation to a mobile telephone according to the present invention that if an aural signal and a character code are coincident, a set dial locked state is released.

In the present invention, it is desirable that it is determined plural times whether an aural signal and a character code are coincident or not.

BRIEF DESCRIPTION OF THE DRAWINGS

These and other objects, features and advantages of this invention will become more fully apparent from the following detailed description taken with the accompanying drawings in which.

In the drawings, the same reference numerals denote the same structural elements.

DESCRIPTION OF THE PREFERRED EMBODIMENT

Figure 1:
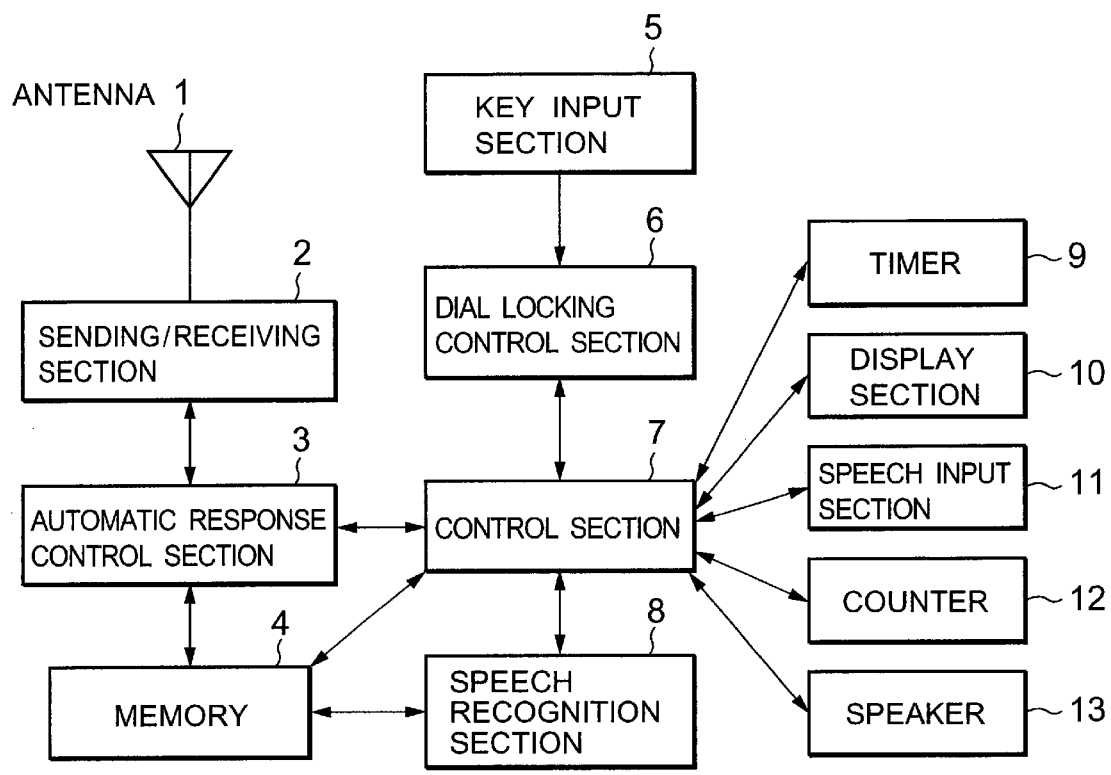
FIG. 1 is a block diagram showing the configuration of a mobile telephone equivalent to a suitable embodiment of the present invention.

Next, referring to the drawings, a suitable embodiment of the present invention will be described in detail.

FIGS. 1 to 5 show an embodiment of a mobile telephone as a suitable example of a mobile terminal according to the present invention.

FIG. 1 is a block diagram showing a mobile telephone equivalent to a suitable embodiment of the present invention.

As shown in FIG. 1, the mobile telephone equivalent to the embodiment of the present invention is composed of an antenna 1, a sending/receiving section 2, an automatic response control section 3, a memory 4, a key input section 5, a dial locking control section 6, a control section 7, a speech recognition section 8, a timer 9, a display section 10, a speech input section 11, a counter 12 and a speaker 13.

The antenna 1 sends or receives an RF signal which is a radio wave. The sending/receiving section 2 encodes an RF signal sent via the antenna 1, decodes a received RF signal and controls sending and receiving. The automatic response control section 3 controls turning on or off an automatic response mode according to a signal from the control section 7, if a call is received while the automatic response mode is turned on, an automatic response message is output and a message from a partner is stored in the memory 4. The automatic response message is registered in the memory 4 beforehand. The memory 4 stores a character code, a message from a remote terminal in an automatic response mode, an automatic response message and setting confirmation voice in various setting.

The key input section 5 is provided with ten keys, a speech recognition dedicated button (a speech recognition button) for turning to a speech recognition mode and others. The dial locking control section 6 controls the setting and the release of dial locking according to a signal from the control section 7. Dial locking means key locking and nullifies pressing each key in the key input section 5. For keys the operation of which is nullified, ten keys, predetermined function keys and others are equivalent. A key the operation of which is nullified is not necessarily limited to only keys required to dial. The control section 7 controls the automatic response control section 3, the memory 4, the dial locking control section 6, the speech recognition section 8, the timer 9, the display section 10, the counter 12 and the speaker 13. The speech recognition section 8 recognizes an aural signal from the speech input section 11 and a recorded message in an automatic response, collates with a character code registered in the memory 4 beforehand and sends the result to the control section 7. The timer 9 is operated in a speech recognition mode and when an automatic response message is recorded and informs the control section 7 that time is up. The display section 10 displays a speech recognition mode, a normal mode, a dial locking mode, an automatic response mode and others according to a signal from the control section 7.

The speech input section 11 converts an input aural signal to analog to digital and sends it to the speech recognition section 8. The counter 12 counts the frequency of the unsuccessful input of voice in the speech recognition mode and when the frequency reaches a set frequency, the counter informs the control section 7 of it. The speaker 13 transmits confirmation in setting each mode by voice or various information voice in recognizing speech.

Next, an operational example of setting and releasing the dial locking function in the mobile telephone equivalent to the embodiment of the present invention will be described referring to the flowchart shown in FIG. 2.

Figure 2:
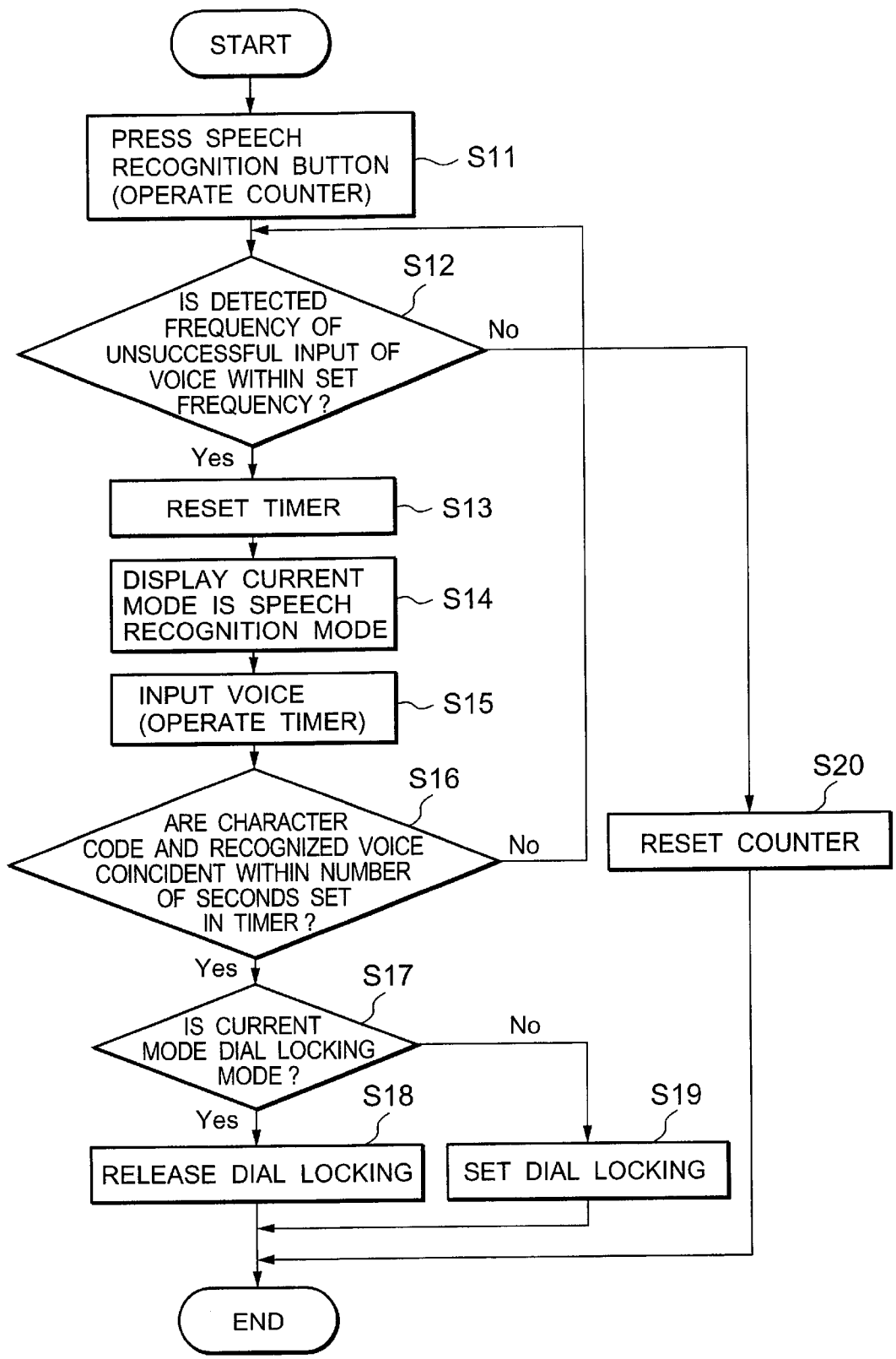
FIG. 2 is a flowchart showing an operational example of setting and releasing a dial locking function of the mobile telephone shown in FIG. 1.

As shown in FIG. 2, first, when a speech recognition button provided to the key input section 5 is pressed in a state in which the mobile telephone waits for an incoming call, the signal is sent to the control section 7, a signal to start a count is sent from the control section 7 to the counter 12 and counting is started (a step S11).

The control section 7 instructs the display section 10 to display that the current mode is a speech recognition mode and becomes a state waiting for the input of voice from the speech input section 11 (a step S14). When voice is input from the speech input section 11, an aural signal is sent from the speech input section 11 to the control section 7 and the control section 7 operates the timer 9 according to the signal (a step S15). The input aural signal is sent to the speech recognition section 8 and in recognition processing applied to the input aural signal, the aural signal to which the recognition processing is applied is collated with a character code registered in the memory 4 beforehand (a step S16). At this time, if a signal showing that time is up is sent from the timer 9 to the control section 7 before a signal showing that the result of speech recognition is coincident is sent from the speech recognition section 8 to the control section 7, the control section 7 terminates the speech recognition processing by the speech recognition section 8, increments a count of unsuccessful speech recognition in the counter 12 by one, resets the timer 9 (a step S13), instructs the display section 10 to display that speech recognition fails, instructs the speaker 13 to announce that speech recognition fails and turns to a speech input waiting state again (a step S14).

The frequency of unsuccessful speech recognition is counted by the counter 12 (a step S12), when the frequency of unsuccessful speech recognition exceeds a set frequency, a signal showing it is sent to the control section 7, the control section 7 instructs the display section 10 to display that a speech recognition mode is forcedly terminated, instructs the speaker 13 to announce that the speech recognition mode is forcedly terminated and forcedly terminates the speech recognition mode.

The setting of the timer in speech recognition and the frequency of unsuccessful speech recognition is arbitrarily set by the owner of a mobile telephone beforehand. Next, if the result of speech recognition processing is coincident with a character code registered in the memory 4 beforehand within the number of seconds set in the timer, a signal showing that the result of the recognition processing is coincident is sent to the control section 7 and the control section 7 controls the dial locking control section 6 as follows.

First, when the mobile telephone is in a normal mode, the dial locking control section 6 locks keys of the key input section 5 (a step S19), instructs the display section 10 to display that the normal mode is turned to a dial locking mode and instructs the speaker 13 to transmit a voice message showing that dial locking stored in the memory 4 beforehand is operated.

Second, when the mobile telephone is in a dial locking mode, the dial locking control section 6 releases the locking of keys of the key input section 5 (a step S18), instructs the display section 10 to display that the dial locking mode is turned to a normal mode and instructs the speaker 13 to transmit a voice message showing that dial locking stored in the memory 4 beforehand is released.

Next, referring to a flowchart shown in FIG. 3 and a timing chart shown in FIG. 4, an operational example in case the dial locking of the mobile telephone equivalent to the embodiment of the present invention is set or released by remote operation will be described.

Figure 3:
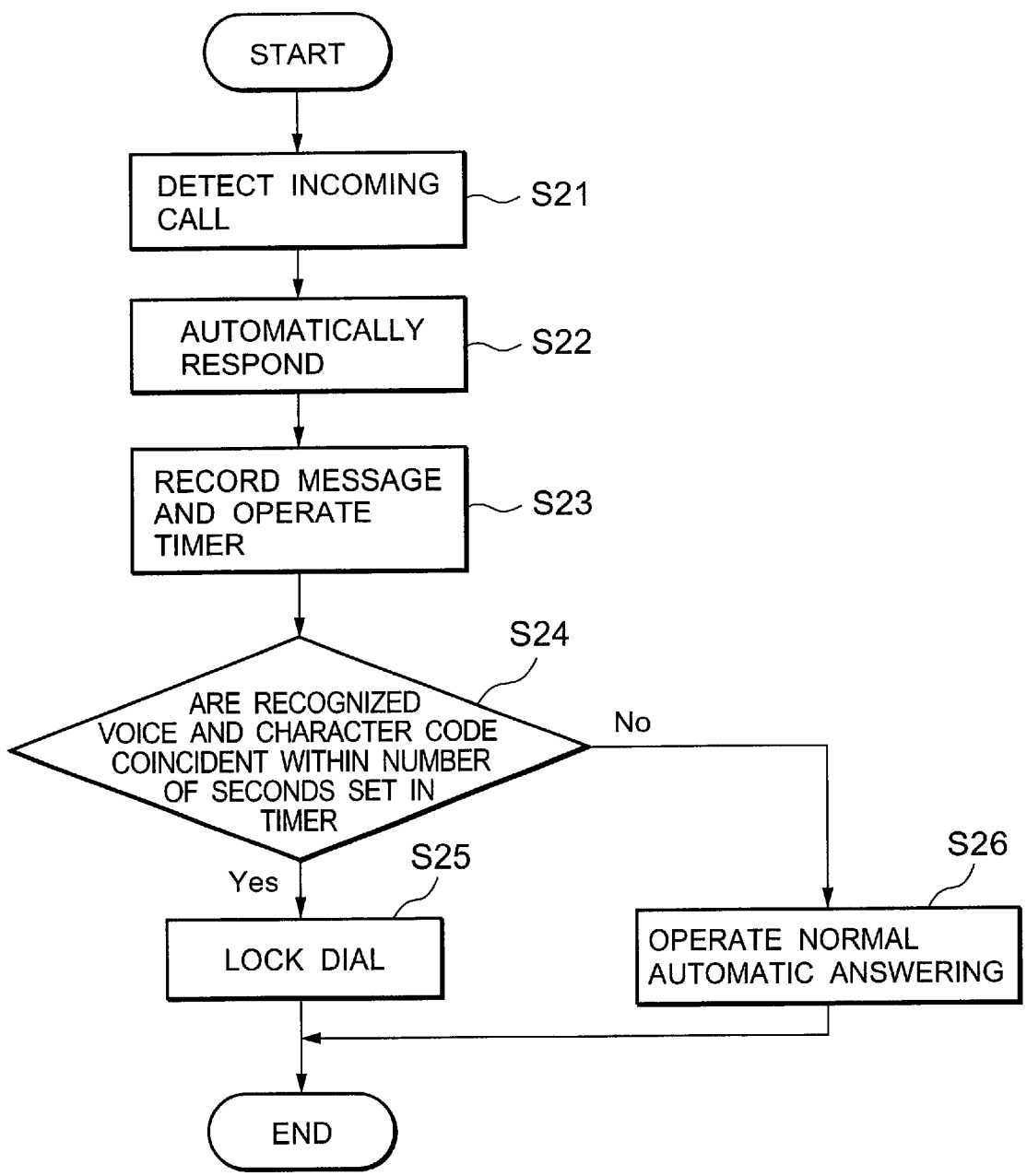
FIG. 3 is a flowchart showing an operational example when the dial locking function of the mobile telephone shown in FIG. 1 is operated from a remote terminal.

As for FIG. 3, first, it is premised that the owner of a mobile telephone sets an automatic response function. In addition, if the mobile telephone is stolen or lost in a state in which dial locking is not performed, the owner of the mobile telephone calls his/her own mobile telephone from another telephone (A1 shown in FIG. 4).

Figure 4:
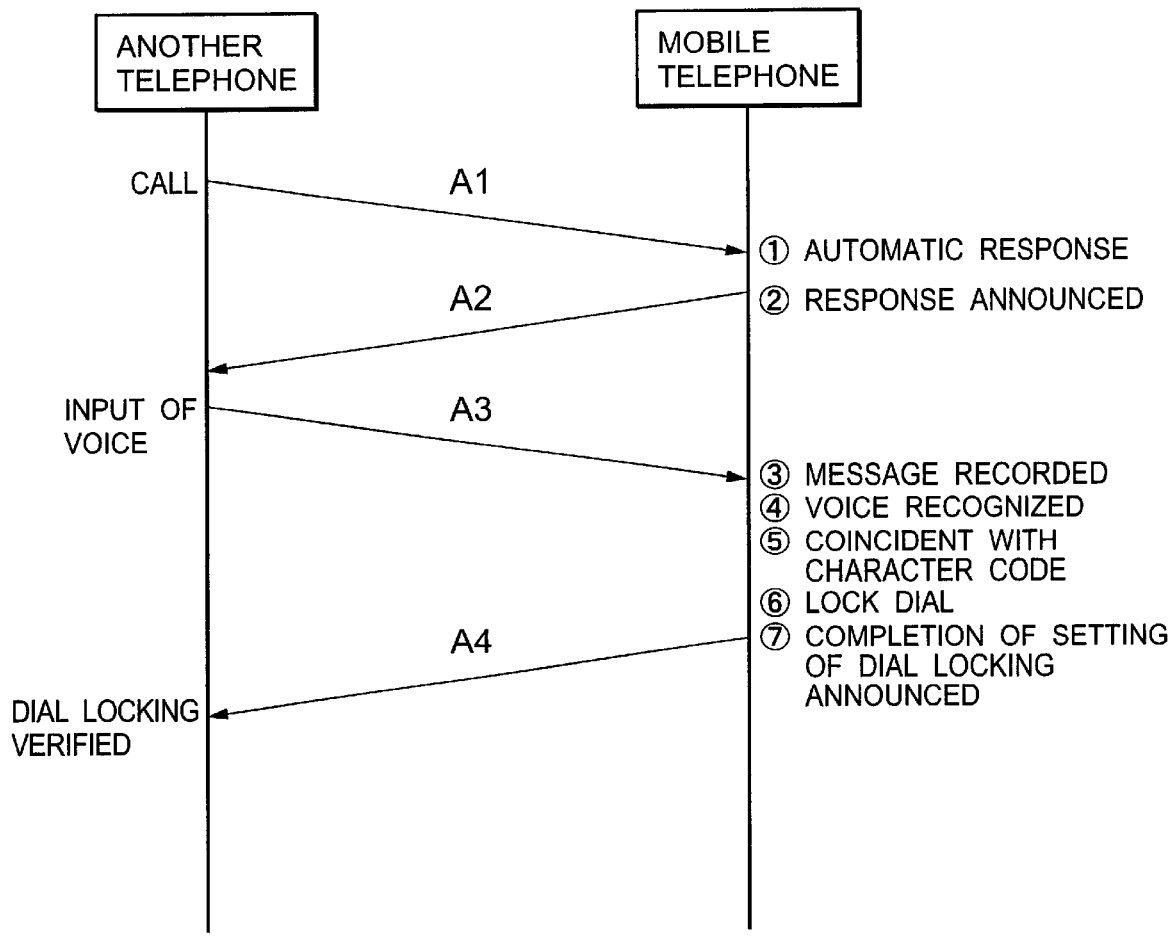
FIG. 4 is a timing chart when a dial locking is set by remote operation in the mobile telephone shown in FIG. 1.

As the automatic response function is set in the mobile telephone, the automatic response control section 3 detects that a call from another telephone is received (a step S21), automatically responds (a step S22) and instructs the speaker to transmit a response announcement registered in the memory 4 beforehand (A2 shown in FIG. 4). After the owner of the mobile telephone hears the automatic response announcement, he/she inputs a character code corresponding to dial locking from another telephone by voice (A3 shown in FIG. 4).

The mobile telephone instructs the memory 4 to store the voice of the owner sent from the remote telephone via the antenna 1 and the sending/receiving section 2 as a message and simultaneously, instructs the timer 9 to start (a step S23). Voice data from the remote telephone is sent from the memory 4 to the speech recognition section 8 and in recognition processing applied to the voice data, the voice data to which the recognition processing is applied is collated with a character code registered in the memory 4 beforehand (a step S24). When time is up in the timer 9, the recording of the message is terminated and if the result of speech recognition between the character code registered in the memory 4 and the voice from the remote telephone is not coincident in the while, normal automatic answering is operated (a step S26).

If the result of speech recognition between the character code registered in the memory 4 and the voice from the remote telephone is coincident before time is up in the timer 9 and the control section 7 receives a signal showing that the result of the speech recognition is coincident from the speech recognition section 8, the signal is sent to the dial locking control section 6, the locking of keys of the key input section 5 is set (a step S25), the automatic response control section 3 instructs to transmit announcement that dial locking registered in the memory 4 is operated (A4 shown in FIG. 4) and the owner of the mobile telephone can verify that dial locking is enabled by remote operation.

Next, referring to a flowchart shown in FIG. 5, operation for registering a character code in the mobile telephone equivalent to the embodiment of the present invention will be described.

Figure 5:
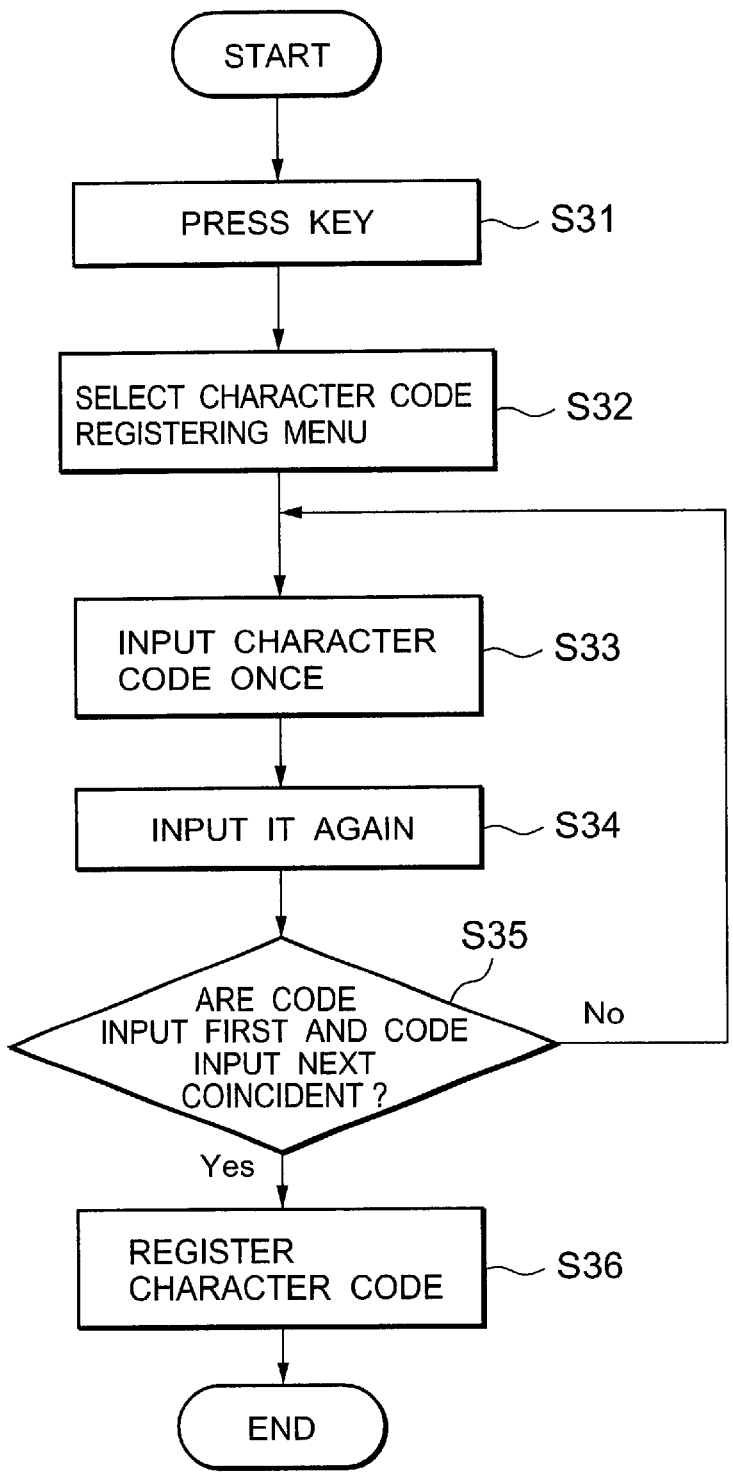
FIG. 5 is a flowchart showing operation for registering a character code in the mobile telephone shown in FIG. 1.

As shown in FIG. 5, first, a menu for registering a character code related to dial locking is selected (a step S32) by pressing a key in a state waiting for an incoming call (a step S31). A first character code is input (a step S33) and is input again for confirmation (a step S34). First input and second input are compared (a step S35) and if they are not coincident, the character code is input again (a step S33). If they are coincident, the input character code is registered (a step S36).

According to the present invention, even if a mobile telephone should be stolen or lost in a state in which dial locking is unset in case a desired character code is registered, its user can set dial locking from remote another telephone only by calling the phone number of his/her mobile telephone and recognizing the registered character code.

As clear from the above description, according to the mobile telephone and the dial locking method respectively according to the present invention, as dial locking can be set by determining whether an aural signal to which speech recognition is applied and a character code registered by its user beforehand are coincident or not in place of personal identification numbers, dial locking can be easily executed without pressing many keys.

Also, according to the mobile telephone and the dial locking method respectively according to the present invention, as dial locking can be set by voice via a remote telephone by setting the automatic response function when the mobile telephone is stolen or lost in a state in which dial locking is unset, worry about the use without the owner's permission and the leakage of the contents of the memory is solved and security can be secured.

While the invention has been described with reference to specific embodiments thereof, it will be appreciated by those skilled in the art that numerous variations, modifications, and embodiments are possible, and accordingly, all such variations, modifications, and embodiments are to be regarded as being with in the spirit and scope of the invention.

What is claimed is:

1. A mobile terminal provided with a speech recognition function, comprising:

registering means for registering a desired character code;

aural signal recognition means for recognizing an aural signal;

determination means for determining whether said character code registered by said registering means and said aural signal recognized by said aural signal recognition means are coincident or not; and locking setting means for setting key locking when said determination means determines that said character code and aural signal are coincident.

2. A mobile terminal provided with a speech recognition function, comprising:

registering means for registering a desired character code;

response means for responding to an incoming call;

recognition means for recognizing an aural signal when said response means responds;

determination means for determining whether said character code registered by said registering means and said aural signal recognized by aural signal recognition means for coincident or not; and locking setting means for setting key locking when said determination means determines that said aural signal and said character code are coincident.

3. A mobile terminal according to claim 2, including:

a button pressed to determine whether said response means is set or not.

4. A mobile terminal according to claim 2, wherein:

said response means sends a message showing that a response is made when responding to said incoming call; and after said message is sent, said response means becomes a recording state for recording said aural signal.

5. A mobile terminal according to claims 1 or 2, including:
key locking release means for releasing a key locked state set by said key locking means when said determination means determines that said aural signal and said character code are coincident.

6. A mobile terminal according to claims 1 or 2, wherein:
said determination means determines plural times whether said aural signal and said character code are coincident or not.

7. A mobile terminal according to claim 1 or 2, wherein:
said mobile terminal is a mobile telephone.

8. A mobile terminal according to claim 7, wherein:
said key locking setting means is dial locking setting means.

9. A mobile terminal provided with a speech recognition function, comprising:
a memory for storing a desired character mode;
an aural signal recognition circuit for recognizing an aural signal;
a control section for detecting whether said character code stored in said memory and the recognized aural signal are coincident or not; and
a dial locking setting control section for setting key locking when coincidence between said character code and said aural signal is detected.

10. A mobile terminal provided with a speech recognition function, comprising:
a memory for storing a desired character code;
an automatic response control section for outputting an off-hook signal in response to an incoming call;
a recognition circuit for recognizing an aural signal when a response is made;
a control section for detecting whether said character code stored is said memory and the recognized said aural signal are coincident or not; and
a locking setting control section for setting key locking when coincidence between said aural signal and said character code is detected.

11. A mobile terminal according to claim 10, wherein:
it is determined by pressing a button whether said response control section is set or not.

12. A mobile terminal according to claim 10, wherein:
said response control section sends a message showing that a response is made when responding to said incoming call; and
said response control section becomes a recording state for recording said aural signal after said message is sent.

13. A mobile terminal according to claim 9 or 10, wherein:
said key locking control section releases a set key locked state when said control section determines that said aural signal and said character code are coincident.

14. A mobile terminal according to claims 9 or 10, wherein:
said control section determines plural times whether said aural signal and said character code are coincident or not.

15. A mobile terminal according to claim 9 or 10, wherein:
said key locking setting means is dial locking setting means.

16. A mobile terminal according to claim 9 or 10, wherein:
said mobile terminal is a mobile telephone.

17. A method of locking keys of a mobile terminal, wherein:
a desired character code is registered;
an aural signal is recognized;
determining whether the registered character code and the recognized aural signal are coincident or not; and
if said character code and said aural signal are coincident, key locking is set.

18. A method of locking keys of a mobile terminal, wherein:
a desired character code is registered;
a response is made to an incoming call;
an aural signal is recognized when the response is made;
determining whether the registered said character code and the recognized said aural signal are coincident or not; and
if said aural signal and said character code are coincident, key locking is set.

19. A locking method according to claim 18, wherein:
determining by pressing a button whether said response is set or not.

20. A locking method according to claim 18, wherein:
a message showing that a response is made is sent when responding to said incoming call; and
after said message is sent, a state is switched to a recording state for recording said aural signal.

21. A locking method according to claim 18, wherein:
if said aural signal and character code are coincident, said key locked state is released.

22. A locking method according to claim 18, wherein:
determining plural times whether said aural signal and said character code are coincident or not.

23. A locking method according to claim 17 or 18, wherein:
said key locking is dial locking.

* * * * *